US012553465B2

(12) United States Patent
McLain

(10) Patent No.: US 12,553,465 B2
(45) Date of Patent: *Feb. 17, 2026

(54) ADJUSTABLE STROKE DEVICE WITH CAM

(71) Applicant: Lake Country Tool, LLC, Oconomowoc, WI (US)

(72) Inventor: Scott S. McLain, Mukwonago, WI (US)

(73) Assignee: Lake Country Tool, LLC, Oconomowoc, WI (US)

( * ) Notice: Subject to any disclaimer, the term of this patent is extended or adjusted under 35 U.S.C. 154(b) by 512 days.

This patent is subject to a terminal disclaimer.

(21) Appl. No.: 18/153,557

(22) Filed: Jan. 12, 2023

(65) Prior Publication Data
US 2023/0167844 A1 Jun. 1, 2023

Related U.S. Application Data

(63) Continuation of application No. 16/550,182, filed on Aug. 24, 2019, now Pat. No. 11,592,055.

(60) Provisional application No. 62/724,889, filed on Aug. 30, 2018.

(51) Int. Cl.
*F16C 3/035* (2006.01)
*F16H 25/04* (2006.01)

(52) U.S. Cl.
CPC ............. *F16C 3/035* (2013.01); *F16H 25/04* (2013.01)

(58) Field of Classification Search
CPC .................................. F16C 3/035; F16H 25/04
See application file for complete search history.

(56) References Cited

U.S. PATENT DOCUMENTS

| | | |
|---|---|---|
| 4,493,585 A | 1/1985 | Axer |
| 4,568,218 A | 2/1986 | Orzal |
| 5,496,132 A | 3/1996 | Pelletier |
| 5,695,298 A | 12/1997 | Sandstrom |
| 5,727,900 A | 3/1998 | Sandstrom |
| 6,385,870 B1 | 5/2002 | Webel et al. |
| 11,592,055 B2 * | 2/2023 | McLain .................. F16H 25/04 |

(Continued)

FOREIGN PATENT DOCUMENTS

| | | |
|---|---|---|
| AU | 2018253644 A1 | 5/2019 |
| CN | 1814409 A | 8/2006 |

(Continued)

OTHER PUBLICATIONS

Australian Examination Report dated Jun. 20, 2024 in corresponding Australian Application No. 2018-253644.

(Continued)

*Primary Examiner* — Michelle Lopez
(74) *Attorney, Agent, or Firm* — Harness, Dickey & Pierce, P.L.C.

(57) ABSTRACT

An adjustable stroke mechanism has a housing with a central axis and a wall defining a cavity. At least one counterweight is movably disposed, at least partially, within the cavity. A mounting assembly is disposed, at least partially, within the cavity. The mounting assembly has a workpiece attachment mechanism. A stroke adjustor couples the at least one counterweight with the mounting assembly. The stroke adjustor enables the counterweight and mounting assembly to move with respect to one another such that a distance between the counterweight and the mounting assembly may be variably adjusted which, in turn, variably adjusts a stroke radius of the workpiece attachment mechanism with respect to the central axis of the housing.

18 Claims, 16 Drawing Sheets

(56) References Cited

U.S. PATENT DOCUMENTS

Figure 1:
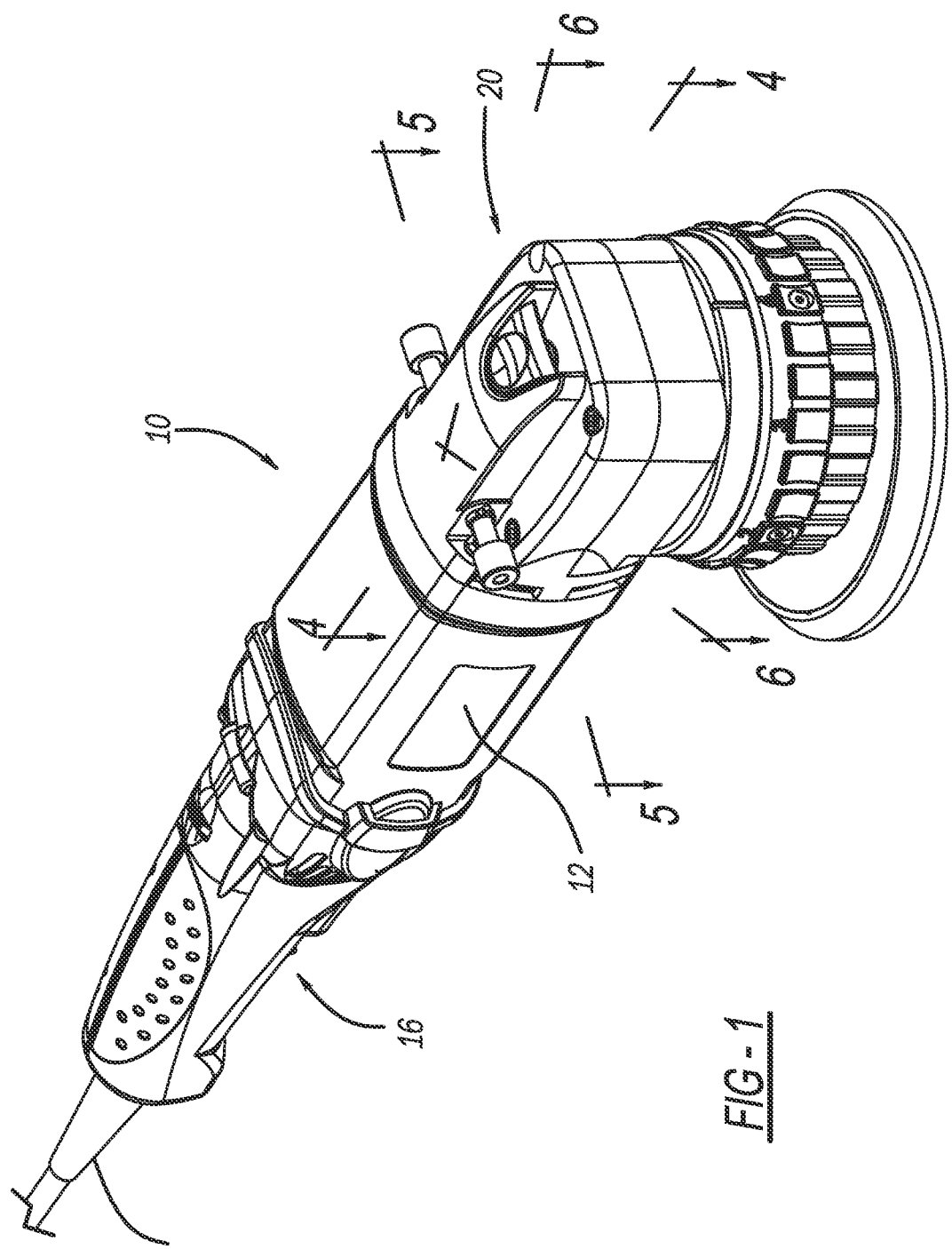

| | | |
|---|---|---|
| 2004/0018053 A1 | 1/2004 | Starry et al. |
| 2006/0189267 A1 | 8/2006 | Zhong |
| 2006/0289264 A1 | 12/2006 | Zhong |
| 2011/0016756 A1 | 1/2011 | Schmidt |
| 2011/0158745 A1 | 6/2011 | Oetken et al. |
| 2012/0251241 A1 | 10/2012 | Sperfslage |
| 2013/0302089 A1 | 11/2013 | Sina |
| 2017/0120413 A1 | 5/2017 | McLain et al. |
| 2017/0268193 A1 | 9/2017 | Laugwitz |
| 2017/0341202 A1 | 11/2017 | McLain et al. |
| 2019/0128392 A1 | 5/2019 | McLain et al. |
| 2020/0072292 A1 | 3/2020 | McLain |

FOREIGN PATENT DOCUMENTS

| | | |
|---|---|---|
| EP | 1688217 A2 | 8/2006 |
| EP | 2 072 183 A1 | 6/2009 |
| EP | 3162499 A2 | 5/2017 |
| EP | 3 476 538 A1 | 5/2019 |
| JP | S60 135171 A | 7/1985 |
| JP | 2001-179591 A | 7/2001 |
| JP | 2002-036089 A | 2/2002 |
| JP | 2007-118097 A | 5/2007 |

OTHER PUBLICATIONS

European Search Report dated Feb. 14, 2020 in corresponding European Application No. 19193789.5.
Notification Of The First Office Action dated Jul. 12, 2022 in corresponding Chinese Application No. 2019108139848.
Indian Office Action dated Aug. 25, 2022 in corresponding Indian Patent Application No. 201934034968.
Japanese Office Action dated Jun. 8, 2023 in corresponding Japanese Application No. 2019-156322 (12 pages).

* cited by examiner

ADJUSTABLE STROKE DEVICE WITH CAM

CROSS-REFERENCE TO RELATED APPLICATIONS

This application is a continuation of U.S. patent application Ser. No. 16/550,182 filed on Aug. 24, 2019, which claims the benefit of U.S. Provisional Application No. 62/724,889, filed on Aug. 30, 2018. The entire disclosure of the above application is incorporated herein by reference.

FIELD

The present invention relates to adjustable orbital devices including, but not limited to, polishers, buffers, sanders, and massagers.

BACKGROUND

The present invention relates to a method and apparatus for adjusting the stroke on a random orbital machine, such as, but not limited to, polishing machines, sanding machines, and massaging machines. This adjustment ability allows a user to define the stroke of the random orbital machine and adjust it between a maximum definitive stroke setting and minimum zero orbit setting.

Polishing machines and sanding machines are routinely used in the automotive detailing industry and home building industry to correct imperfections in the paint or drywall and to apply polishes and waxes. There are three primary machines used, including rotary buffers, random orbital machines, and dual action machines. Each tool has its place, as the manner in which the pad spins on each machine is unique and used for different purposes.

Rotary buffers are the fastest and most effective machine for removing paint defects in a controlled manner with good results. The drive unit used in a rotary buffer is directly connected to the pad and each one is in axial alignment with each other. In order to correct paint scratches, the rotary buffer is commonly used to remove enough paint surrounding the scratches to make the surface level. Removing scratches, however, requires more skill and control of the machine than a typical hobbyist possesses. For this reason, rotary buffers are commonly avoided by average users as it is very easy to remove too much paint and damage the finish by causing swirl marks or by burning the paint.

Random orbital machines were introduced in order to meet the needs of an average user, as they require less experience and control to operate. A random orbital machine uses a gear case that employs two unique mechanisms which move a pad attached to a backing plate. Unlike a rotary buffer, random orbital machines place the central rotational axis of the pad and the backing plate offset from the driveshaft of the machine. This offset is commonly referred to as the "stroke". As a result, the backing plate and pad orbit the driveshaft in a circular motion. At the same time, the pad randomly spins, as it is mounted on an idle bearing. This random spinning varies with pressure applied on the pad and is not directly powered. The result is a polishing action that will not burn or cut through the paint as it will not produce the heat from a powered spinning action. Random orbital machines are, therefore, much safer and dramatically less likely to cause swirls or burn through the paint.

Similar to random orbital machines, dual action machines place the central rotational axis of the pad and the backing plate offset from the driveshaft. As a result of this stroke, the backing plate and pad orbit the driveshaft in a circular motion. However, with a dual action machine the spinning of the pad is directly powered.

At the heart of a random orbital machine is the machine's stroke. The stroke is determined by the offset between the driveshaft axis and the backing axis. A longer offset or stroke places the backing plate rotational axis farther away from the driveshaft axis. Multiplying the offset by two produces the stroke diameter. The "stroke" is, therefore, a term that identifies the diameter of the path the backing plate travels as it orbits around the driveshaft.

A majority of random orbital machines are small stroke machines, which mean they use a stroke length that measures somewhere between approximately 6 mm-12 mm. A small stroke machine limits the movement of the pad to a smaller and tighter orbit. This results in a smoother action. A small stroke machine is also easier to control because the backing plate orbits around the driveshaft rotational axis in a tighter path. There are less vibrations and movement making the machine easier to hold due to the smoother action.

A large stroke machine delivers increased orbits per minute (OPM) of backing plate motion using the same rotations per minute (RPM), as the orbit of the backing plate and the pad around the drive shaft is increased. A large stroke also increases movement of the pad which helps spread out polishing compounds and treats a larger surface area. It also accomplishes more cutting action into the paint which allows for scratches and paint defects to be corrected. Small stroke machines typically only polish the paint and do not cut into it, and, therefore, are not able to remove surface defects.

One method of addressing the deficiencies of a small stroke has been to increase the RPM of the machine. While this increases the rotation of the motor, the machine stroke stays the same. There are also longevity issues associated with increased RPM for the motor and increased OPM for the pad. Increasing the RPM puts more strain on the motor, while increased OPM burns out a pad faster.

In sum, both long stroke and short stroke machines have their place in the industry. Therefore, what is needed is a machine that can be adjusted by the user without special tools or disassembly of the machine. Finally, what is needed is a compact, simple, and effective method to adjust the stroke of a machine based on the needs of the user.

SUMMARY

According to the disclosure, an adjustable stroke mechanism for a random orbital machine comprises a housing having a central axis and a wall enclosing a cavity. At least one counterweight is movably disposed within the cavity. A mounting assembly is disposed within the cavity. The mounting assembly includes a workpiece attachment mechanism. A stroke adjustor couples the at least one counterweight with the mounting assembly. The stroke adjustor enables the counterweight and mounting assembly to move with respect to one another such that a distance between the counterweight and the mounting assembly is variable adjusted. Accordingly, this variable adjustable the stroke radius of the workpiece attachment mechanism with respect to the central axis of the housing. The stroke adjustor includes an adjusting ring and a cam mechanism. The adjustor ring surrounds the wall of the housing. The adjustor ring is axially movable along the central axis. Additionally, the adjustor ring is rotatable around the central axis. The counterweight engages the cam mechanism to move the counterweight in response to cam movement. The mounting assembly, including a bearing carriage, engages the cam mechanism to move the mounting assembly in response to cam movement. The workpiece attachment mechanism further comprises a bearing axle. The bearing axle extends through the housing through a bearing carriage and into the counterweight. At least one bearing surrounds the bearing axle and the at least one bearing is disposed within the orifice of the bearing carriage. The cam mechanism further comprises at least one tab. The at least one tab engages a slot in a hub for locking the stroke adjustor.

According to a second embodiment, a method of adjusting a stroke of a random orbital machine comprises coupling an adjustable stroke mechanism. It includes an adjustable stroke mechanism for a random orbital machine comprises a housing having a central axis and a wall enclosing a cavity. At least one counterweight is movably disposed within the cavity. A mounting assembly is disposed within the cavity. The mounting assembly includes a workpiece attachment mechanism. A stroke adjustor couples the at least one counterweight with the mounting assembly. The stroke adjustor enables the counterweight and mounting assembly to move with respect to one another such that a distance between the counterweight and the mounting assembly is variable adjusted. Accordingly, this variable adjustable the stroke radius of the workpiece attachment mechanism with respect to the central axis of the housing. The stroke adjustor is axially moved with respect to the central axis of the housing. The stroke adjustor rotates about the central axis of the axis. The counterweight and mounting assembly move with respect to one another. A distance between the counterweight and the mounting assembly is variably adjusted. A stroke radius of the workpiece attachment mechanism is variably adjusted with respect to the central axis.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
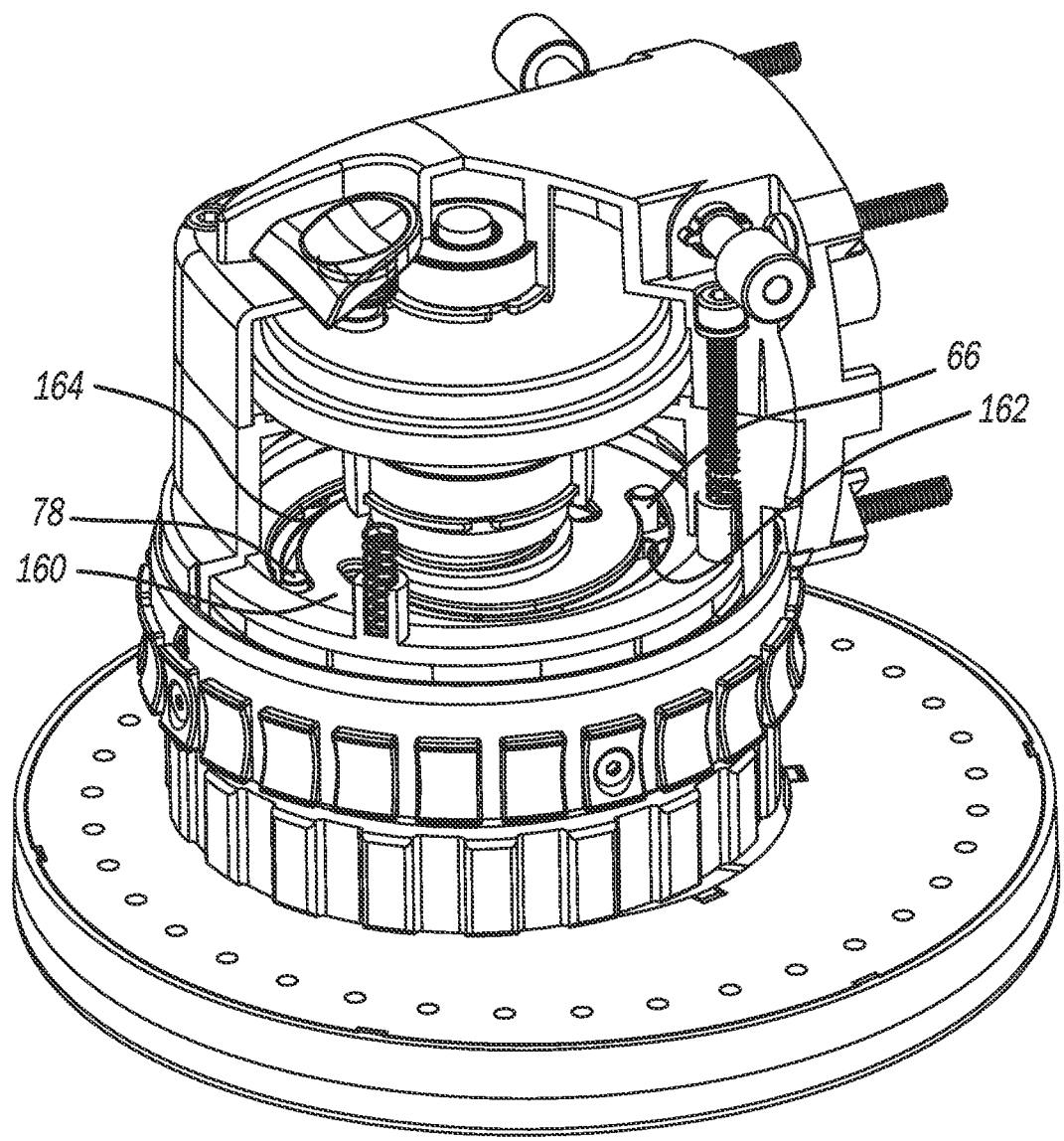
Figure 3:
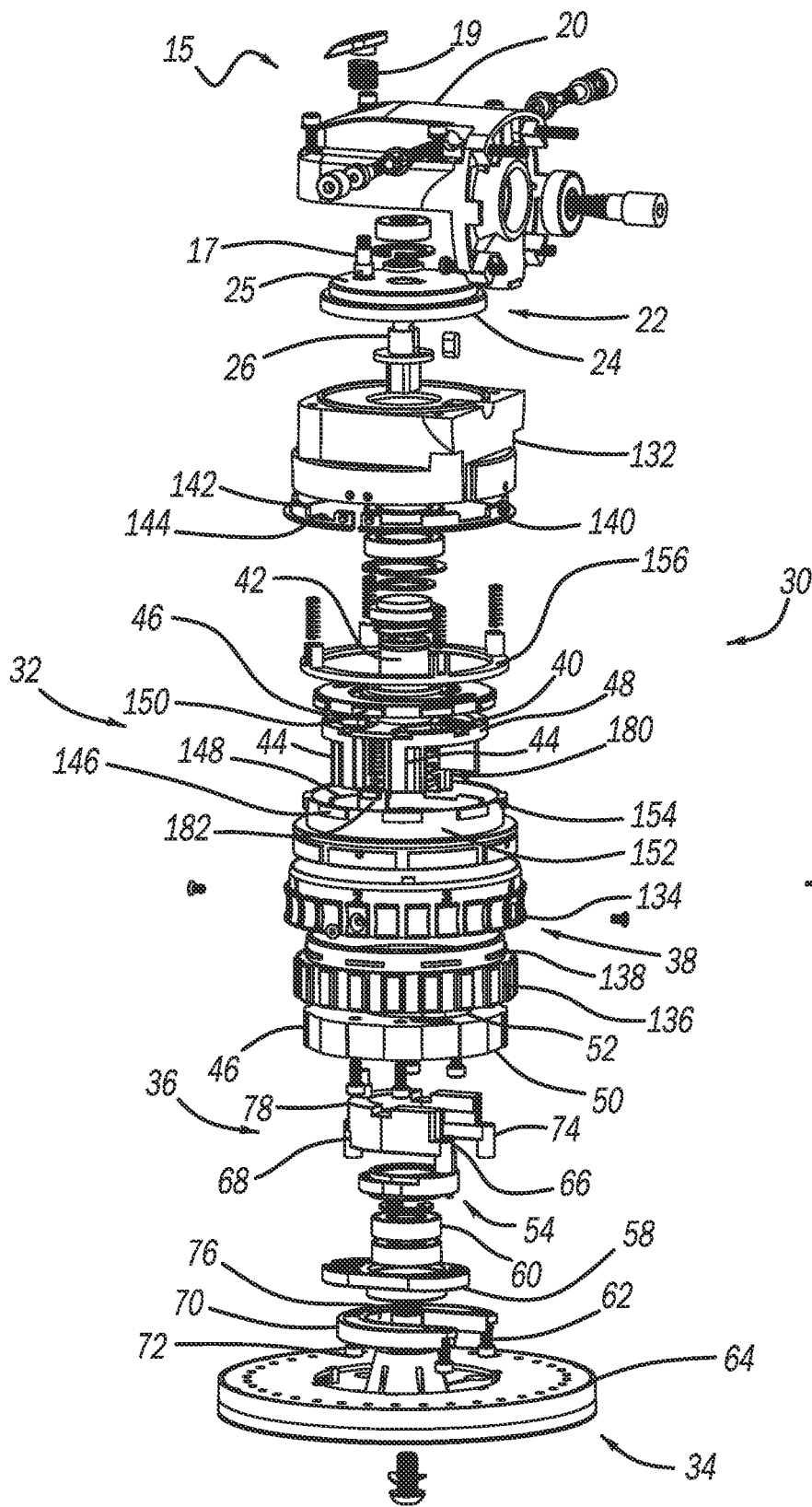
Figure 4:
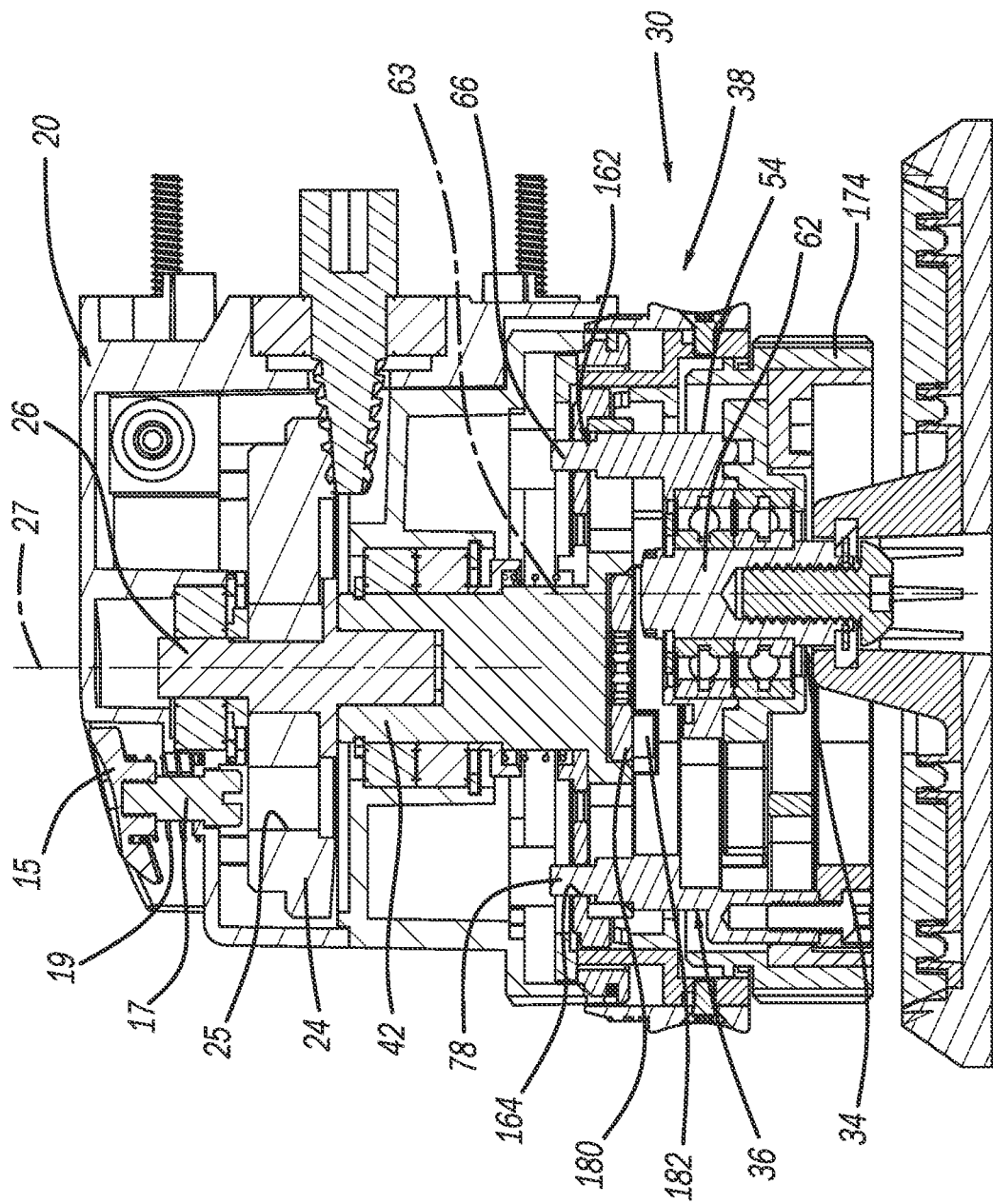
Figure 5:
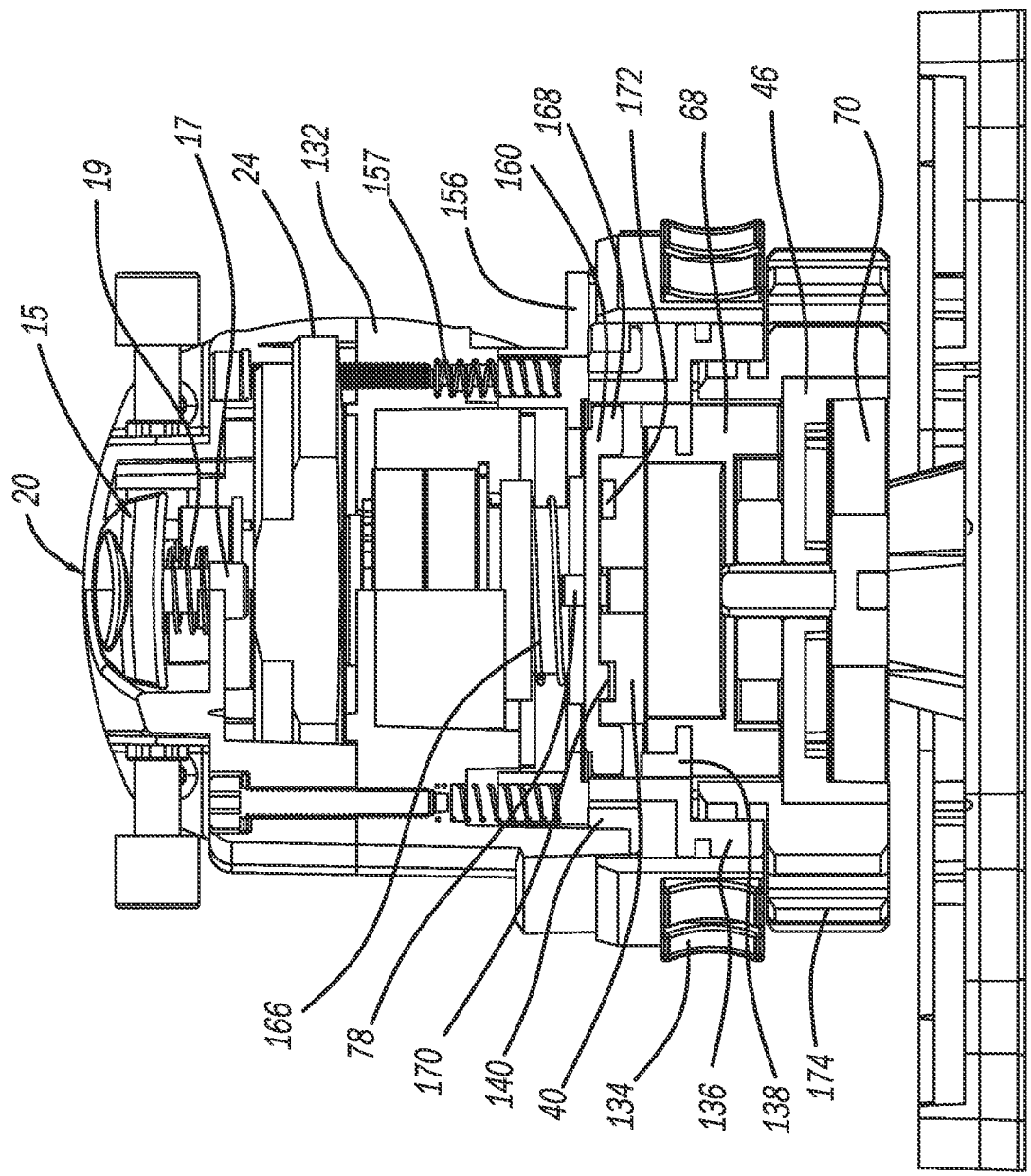
Figure 6:
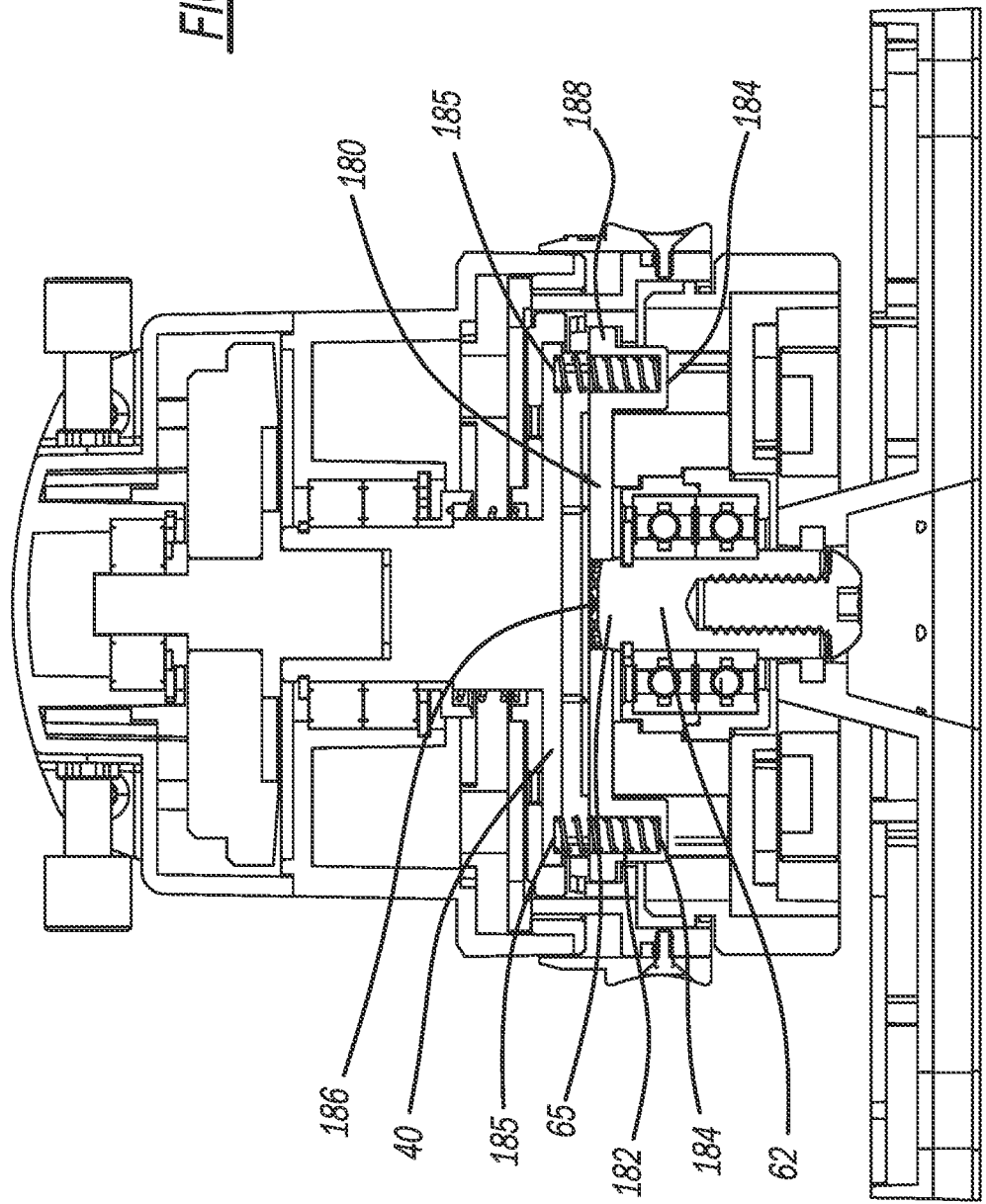
Figure 7:
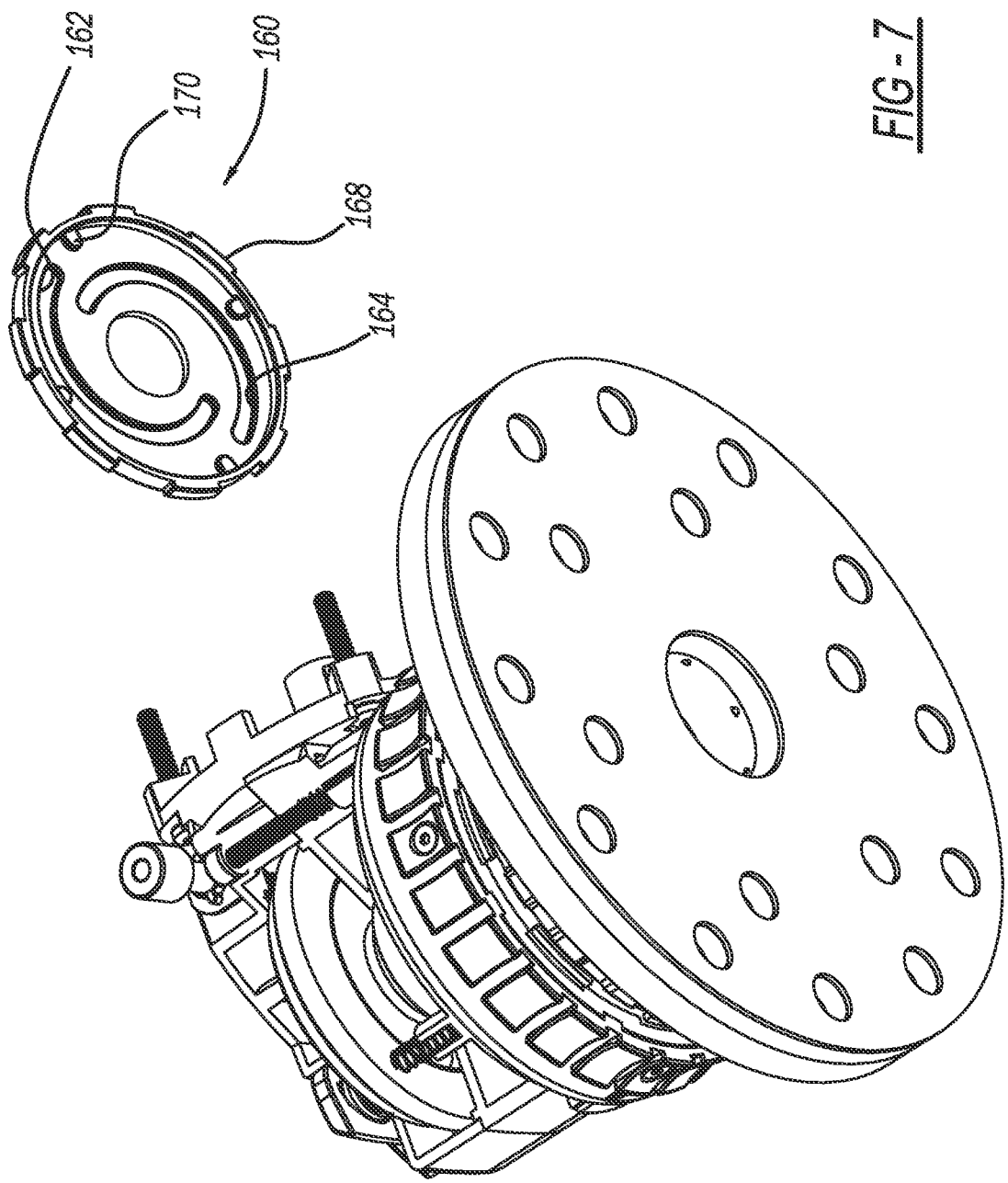
Figure 8:
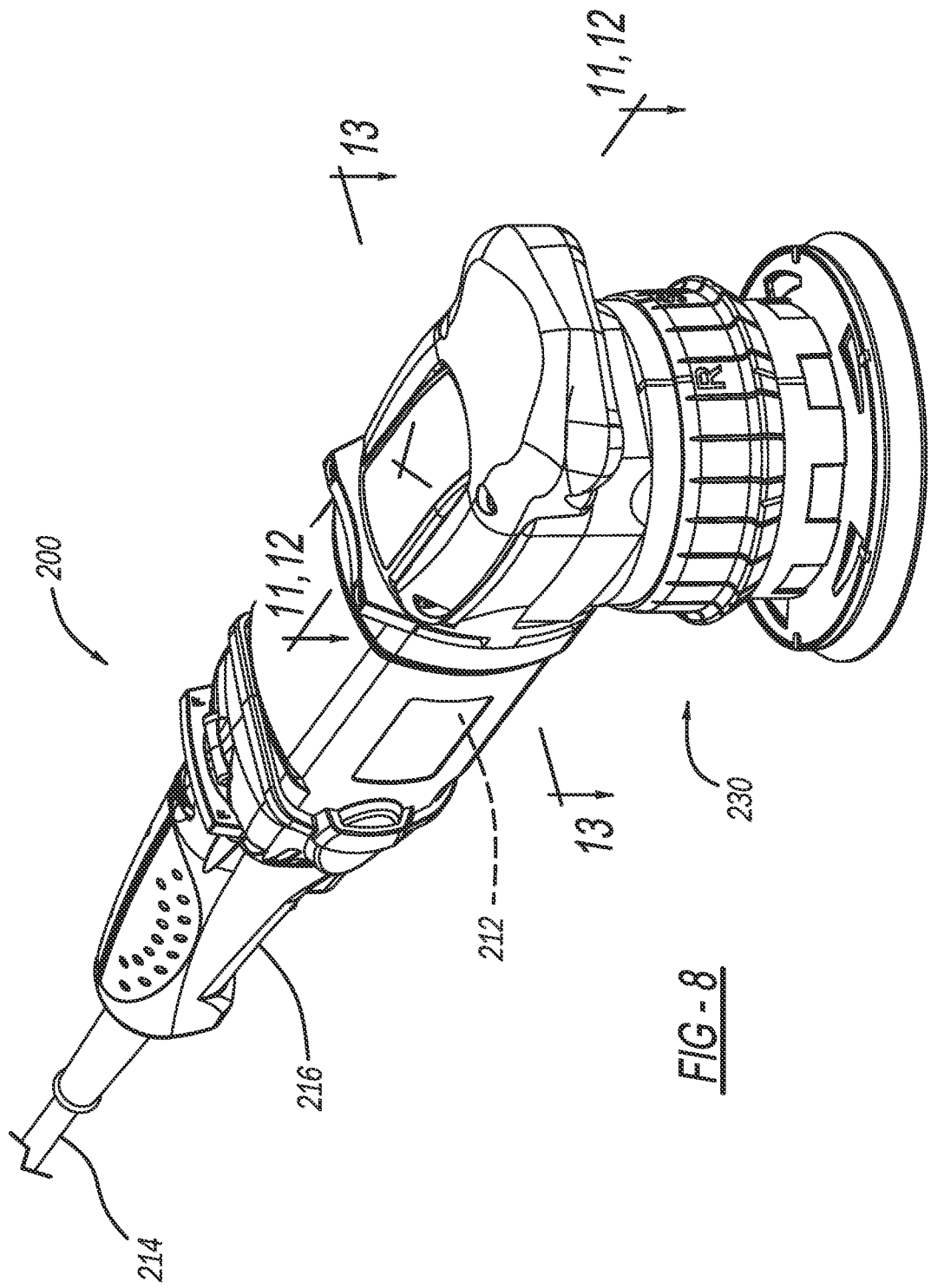
Figure 9:
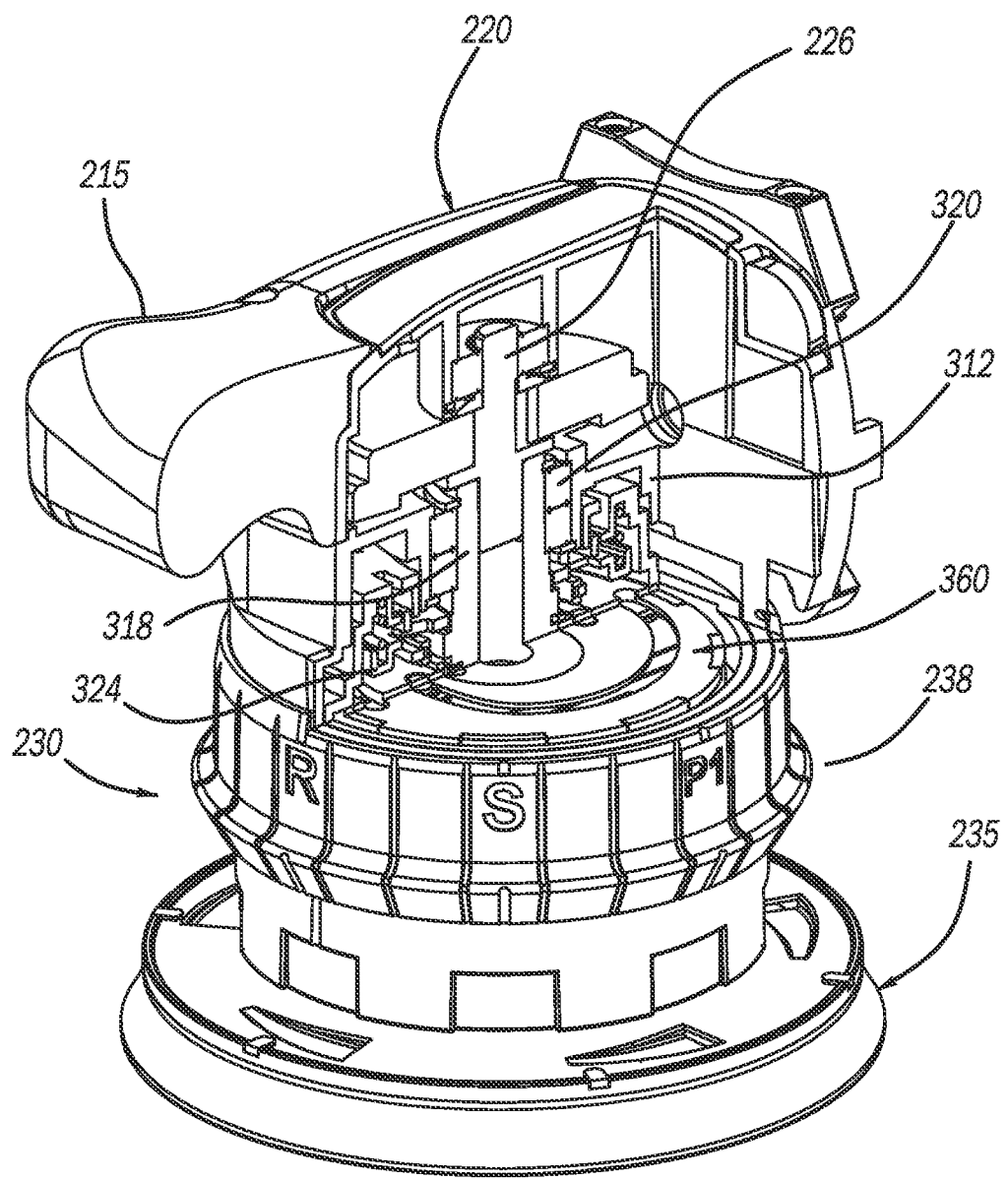
Figure 10:
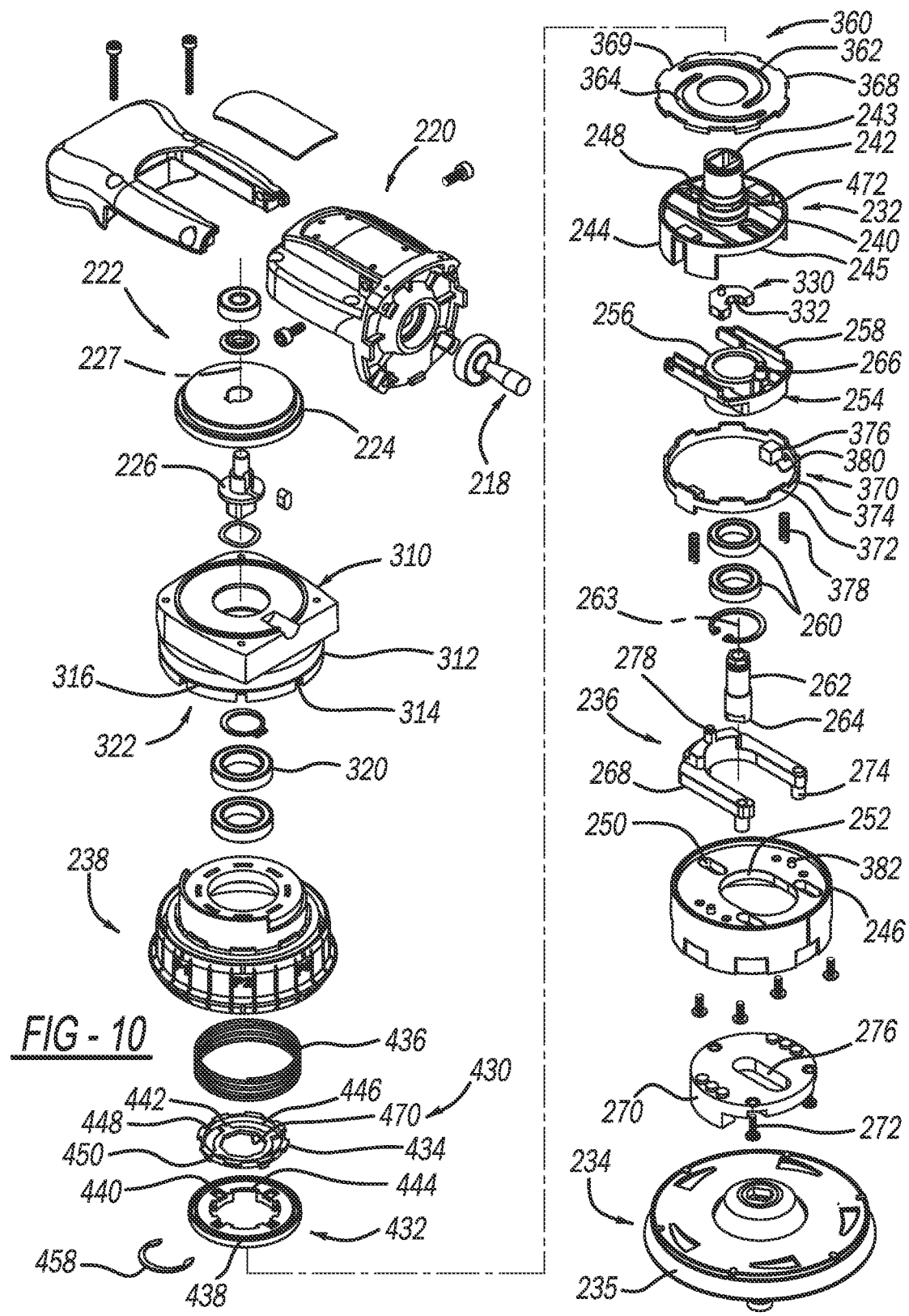
Figure 11A:
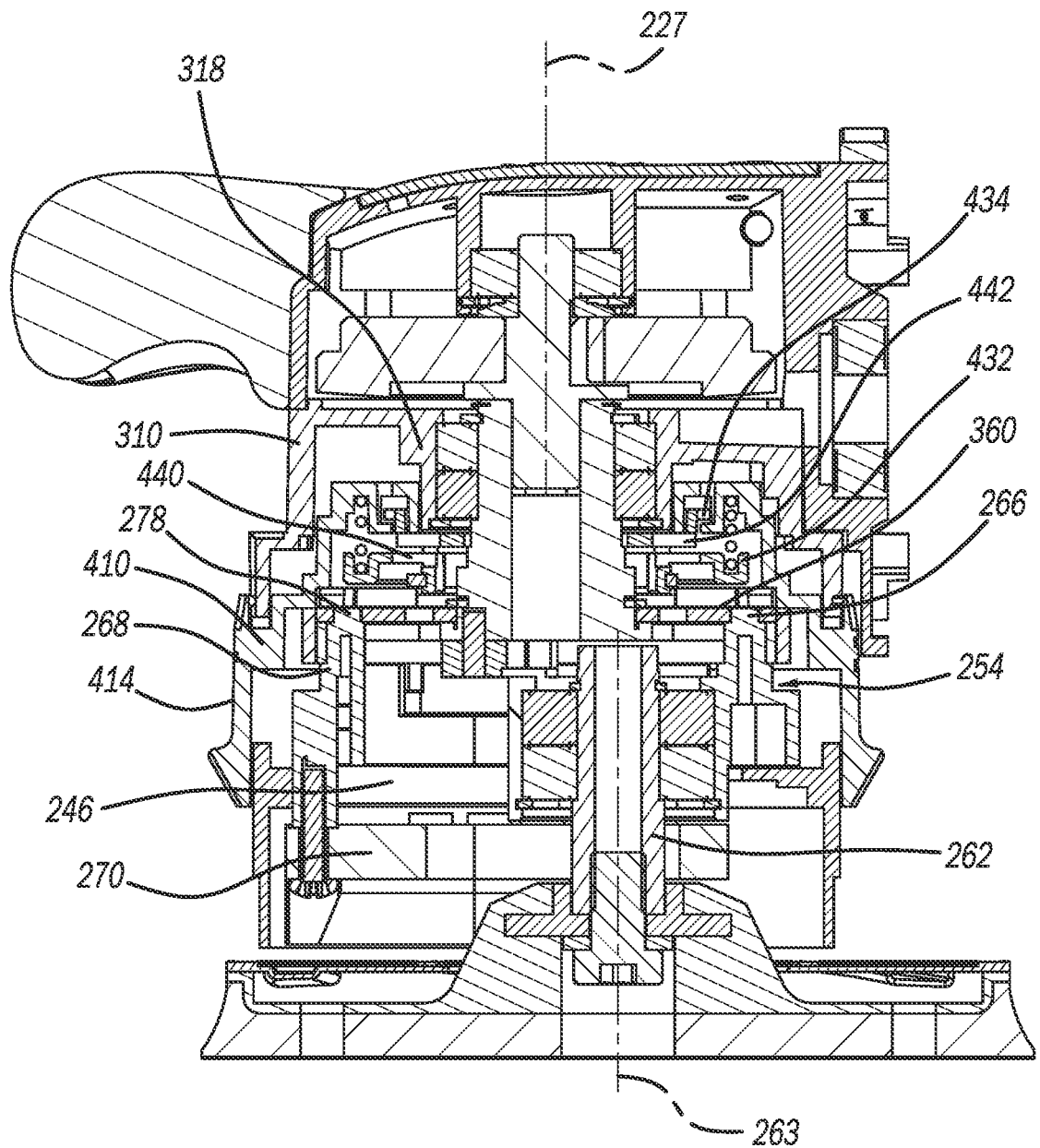
Figure 11B:
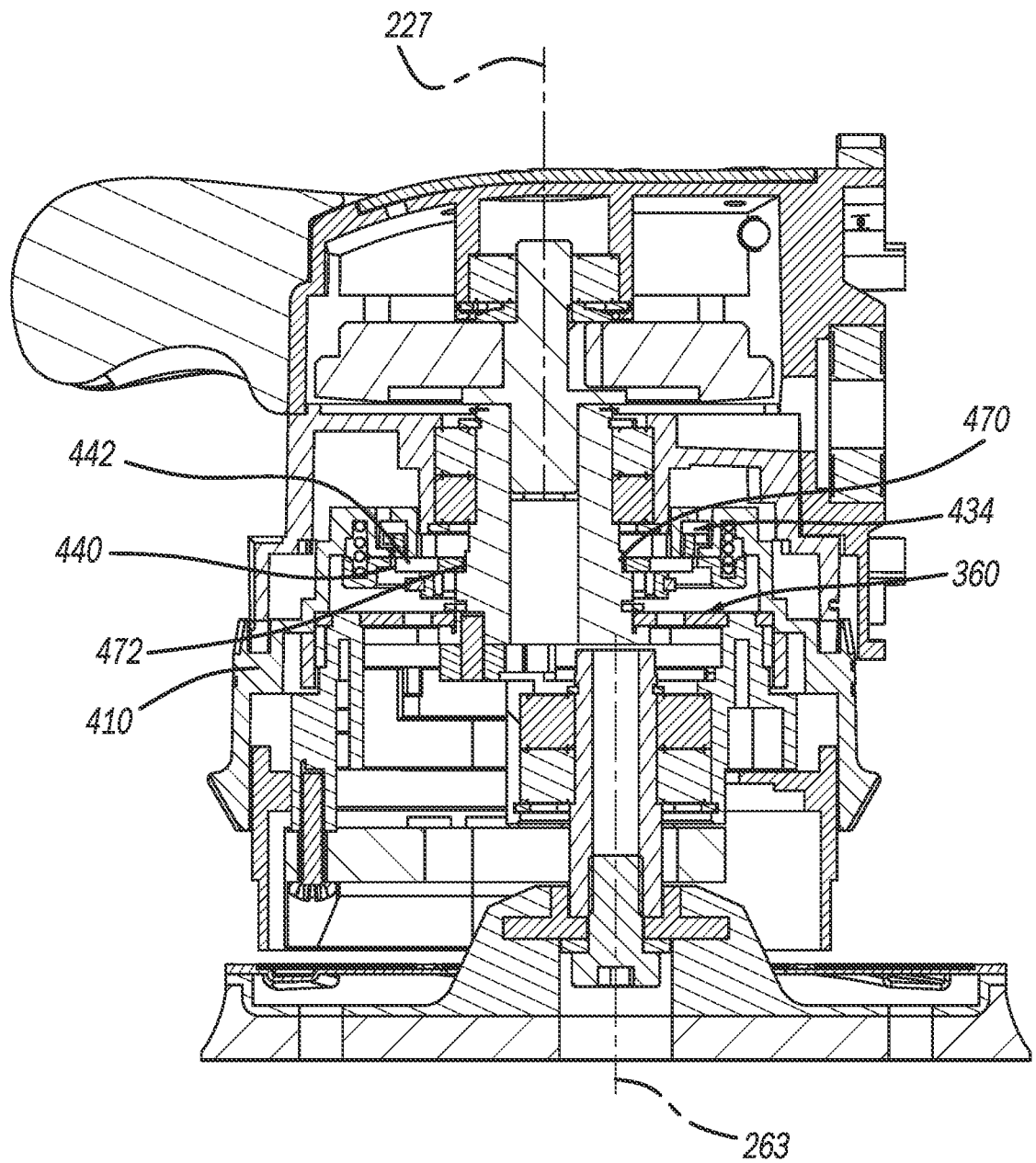
Figure 12:
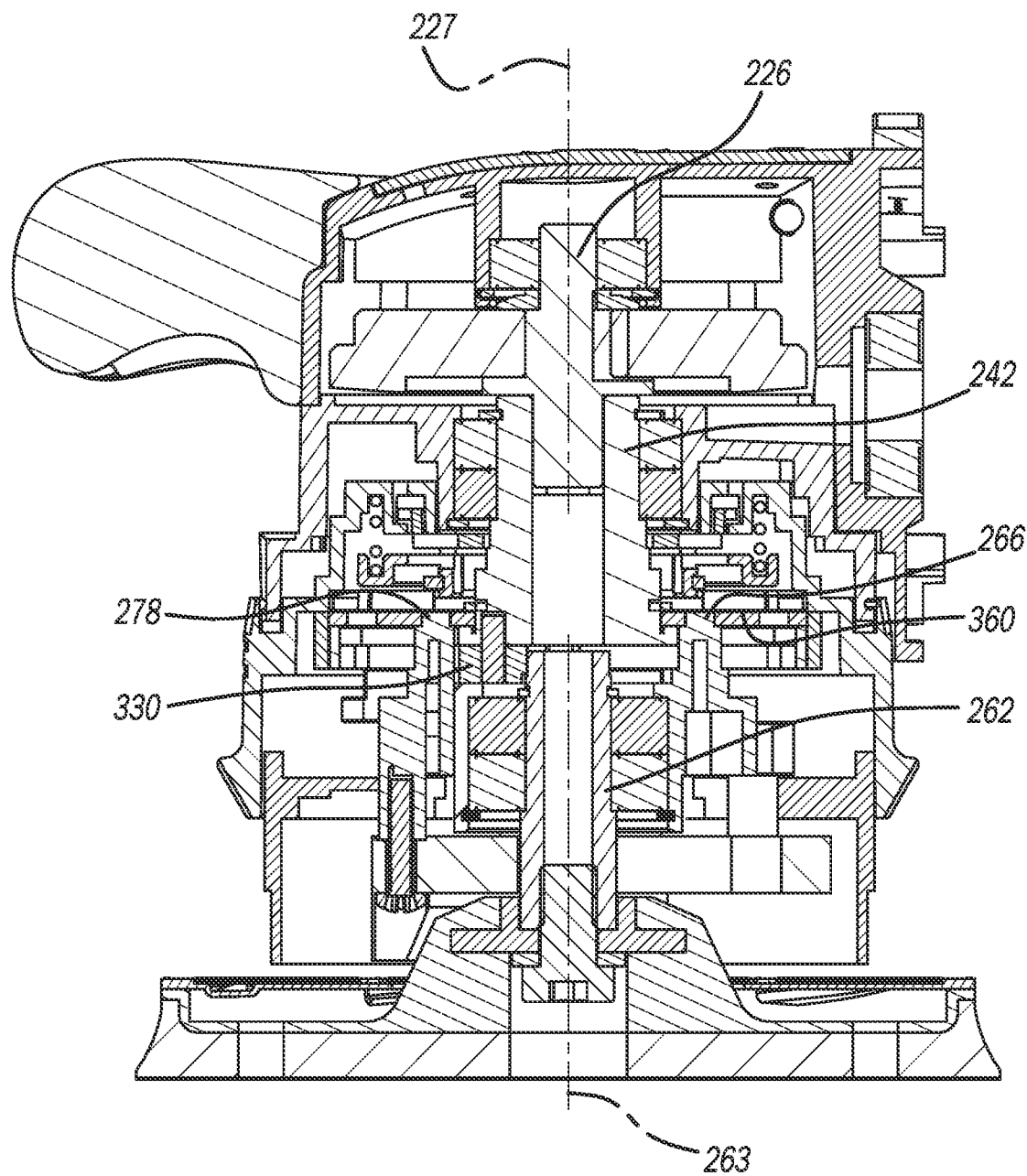
Figure 13:
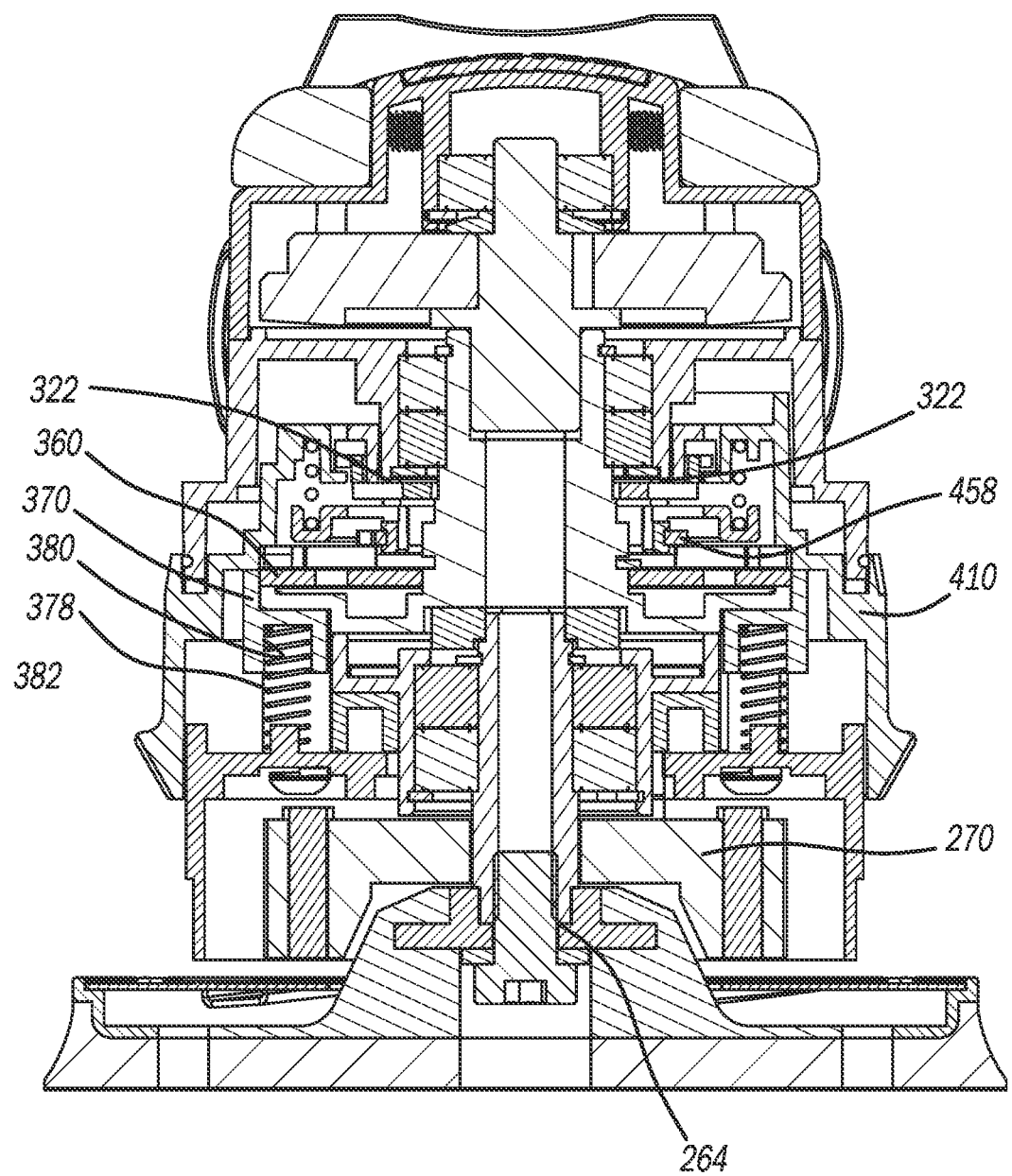
Figure 14:
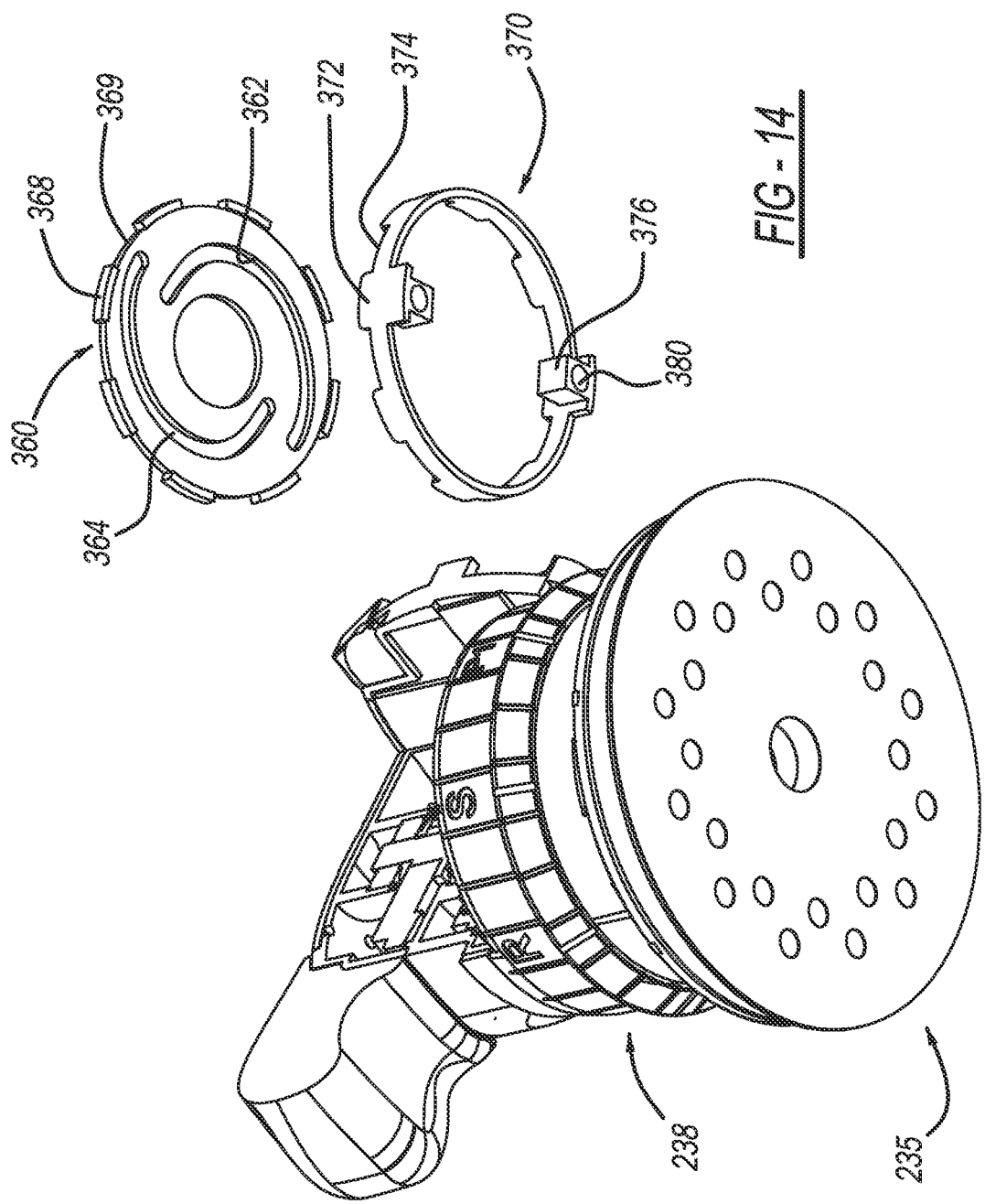
Figure 15:
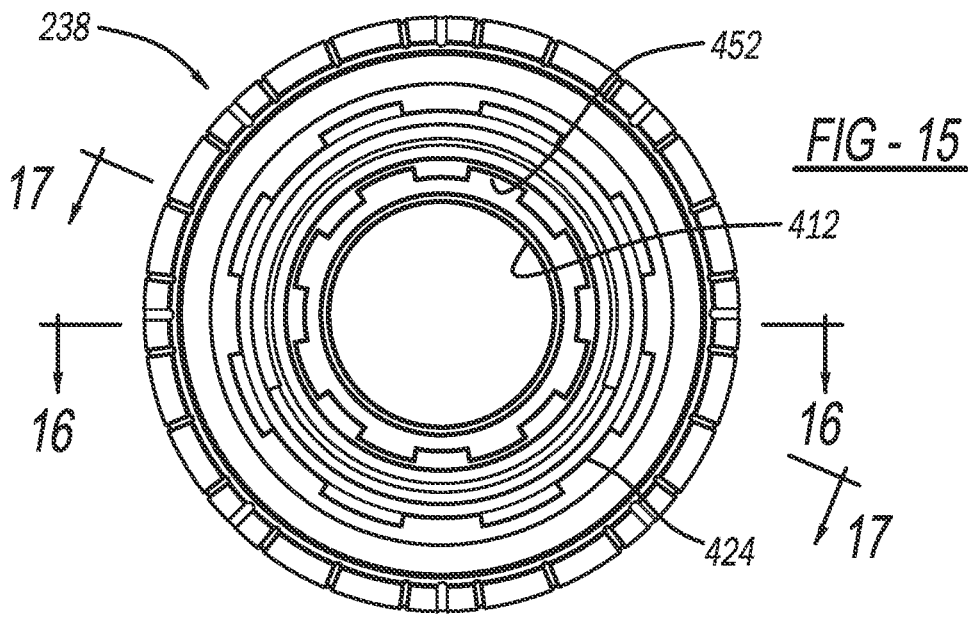
Figure 16:
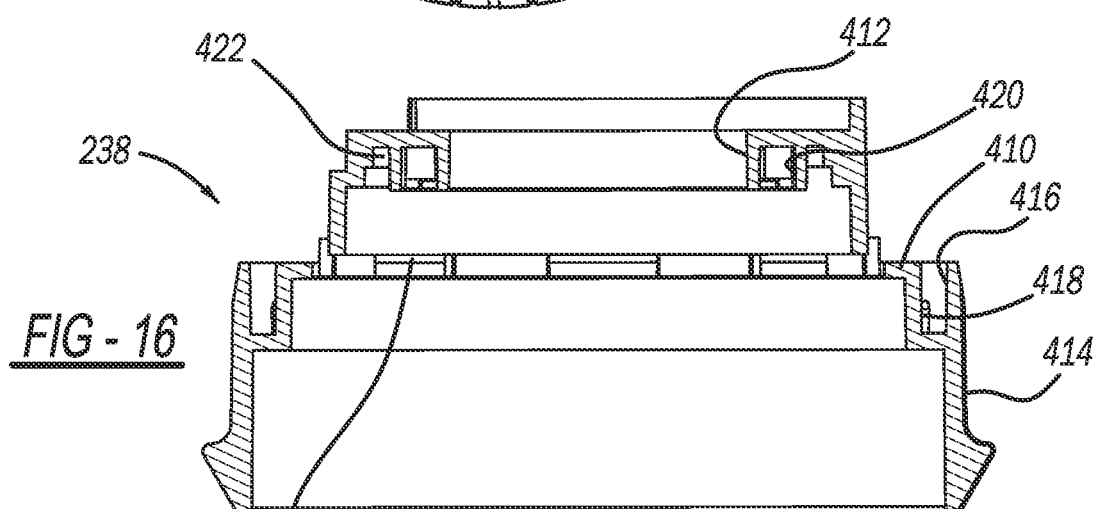

FIG. 1 is a perspective view of the tool.
FIG. 2 is a perspective view partially cut away of FIG. 1.
FIG. 3 is an exploded perspective view of FIG. 1.
FIG. 4 is a cross-sectional view of FIG. 1 along line 4-4.
FIG. 5 is a cross-sectional view of FIG. 1 along line 5-5.
FIG. 6 is a cross-sectional view of FIG. 1 along line 6-6.
FIG. 7 is a perspective view of the cam plate of FIG. 1.
FIG. 8 is a perspective view of the tool.
FIG. 9 is a perspective view partially cut away of FIG. 8
FIG. 10 is an exploded perspective view of FIG. 1.
FIG. 11A is a cross-sectional view of FIG. 8 in a first position.
FIG. 11B is a cross-sectional view of FIG. 8 in a second position.
FIG. 12 is a cross-sectional view of FIG. 1 along line 12-12.
FIG. 13 is a cross-sectional view of FIG. 1 along line 13-13.
FIG. 14 is a perspective view of the cam plate of FIG. 8.
FIG. 15 is a bottom plan view of the adjuster.
FIG. 16 is a cross-section view of FIG. 15 along lines 16-16.

Figure 17:
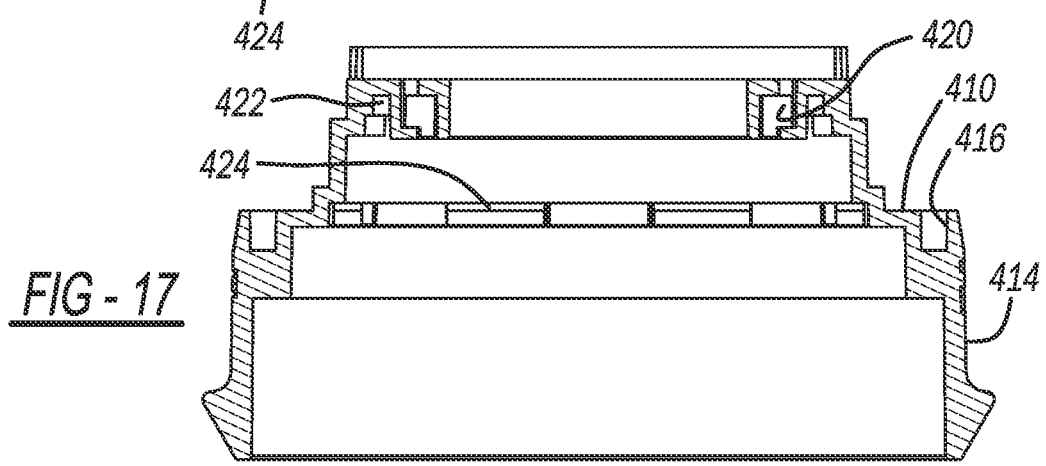

FIG. 17 is a cross-section view of FIG. 15 alone lines 17-17.

DETAILED DESCRIPTION

Example embodiments will now be described more fully with reference to the accompanying drawings.

Turning to the figures, a tool is illustrated with an adjustable stroke device and is designated with the reference numeral 10. The tool 10 includes a motor 12, a power source 14 and a switch 16 for activating and deactivating the power source. The power source is shown as a cord but could be a rechargeable battery. The motor includes a pinion 18 that is positioned inside of a head housing 20 of the tool. The head housing 20 includes a cavity to house a drivetrain 22. The drivetrain 22 includes a gear 24 meshing with the pinion 18 and a rotatable spindle 26. The stroke adjustor 30 is rotatably coupled with the spindle 26 and is mounted with the bottom of the head housing 20.

The head housing 20 includes a push button 15. The push button 15 includes a pin 17 and a spring 19. The spring 19 biases the push button 15 between a first and second position. The pin 17 projects into a bore 25 in the gear 24. This provides a rotation stop for the drive train. Also, when the pin 17 is in the bore 25, the stroke adjustor 30 is in an indexed position.

The stroke adjustor 30 includes a drive hub 32, a workpiece mounting assembly 34 and a counterbalance mechanism 36 and a stroke adjustment mechanism 38. The drive hub 32 includes a drive hub body 40 with a nipple 42 as well as extending legs 44. The nipple 42 extends from one side of the drive hub body 40 while the legs 44 extend from the other. The nipple 42 is threaded to receive the spindle 26. A hub plate 46 is attached to the legs 44 by threaded fasteners. The drive hub body 40 includes a plurality of slots 48 that couple with the counterweight mechanism 36 and workpiece mounting assembly 34 as will be explained later. Additionally, the hub plate 46 includes a plurality of slots 50 that couple with the counterweight mechanism 36. Also, the hub plate 46 includes an aperture 52, with an elliptical shape, that receives a portion of the workpiece mounting assembly 34. Thus, rotation of the spindle 26 is applied to the drive hub 32 to drive the stroke adjustor 30.

The workpiece mounting assembly 34 includes a carriage 54. The carriage includes a first carriage block 56 and a second carriage block 58. The carriage blocks 56, 58 include bores to receive bearings 60. A spindle 62 is passed through the bearings 60 and held by the carriage 54. The spindle 62 is rotatable in the bearings 60. Also, the spindle 62 includes a threaded tip 64 that enables a workpiece, such as a pad or the like, to be attached to the spindle 62. The spindle 62 passes through the aperture 52 in the hub plate 46. The first carriage block 56 includes a post 66 that passes through the slot 48 in the drive hub body 40. The post 66 is coupled with the stroke adjustment mechanism 38 as will be explained later.

The counterweight mechanism 36 includes a frame 68 and a counterweight ring 70. The counterweight ring 70 is secured to the frame 68 via fasteners 72. Both the frame 68 and counterweight ring 70 have an overall U-shape. The frame 68 includes a plurality of posts 74 that pass through the channels 50 in the hub plate 46. Thus, the counterweight ring 70 is attached to the underside of the hub plate 46. Also, the counterweight ring 70 includes a slot or channel 76 that enables the spindle 64 to pass through the channel 76. The counterweight frame 68 also includes a post 78. The post 78 passes through the slot 48 in the drive hub body 40.

The head housing 20 includes a second housing 132. The housing 132 includes a grip ring 134, a sleeve 136, a ring 138 and band 140. The grip ring 134 is positioned over the sleeve 136 and connected to it via fasteners. The ring 138 is positioned inside of the sleeve 136. The band 140 is positioned outside of the sleeve 136. The band 140 includes a plurality of stepped peaks 142 and valleys 144. The stepped peaks 142 and valleys 144 are positioned so that the peaks 142 receive tabs 146 that project radially from the sleeve 136. The sleeve 136 also includes tabs 148 on its inner peripheral surface to receive the cutouts 150 of the ring 138. The ring 138 also includes upper peaks 152 and valleys 154 that create a rectangular cutout. A pusher ring plate 156 is positioned above the grip 134, sleeve 136, ring 138 and band 140 combination. The pusher ring plate 156 is biased by springs 157 so that once the grip 134 is moved axially toward the housing head 20, the pusher ring plate 156 force moves it back to its original resting position.

The cam plate 160 includes a pair of arcuate slots 162, 164. One slot 162 receives the carriage post 66 and the other arcuate slot 164 receives the counterweight frame post 78. The cam plate 160 includes radially projecting teeth 168 that secure the cam plate 160 with and inside the sleeve 136. Also, the cam plate 160 includes at least one, preferably a plurality, tab 170 on its bottom side to mesh with slots 172 on the cam body 40. The cam plate 160 is rotated by the stroke adjustment mechanism grip 134. As this occurs, the post 78, 66 move the counterweight mechanism 36 and workpiece mounting assembly 34 with respect to one another. Also, the rotational movement moves the axis 63 of the spindle 62 toward or away from the central axis 27 of the drive spindle 26. The tabs 170 are positioned into the slots 172 on the cam body 40. Thus, depending upon the position of the spindle 62 with respect to the central axis 27, the tabs 172 will be in different slots 172 to enable variable positioning of the spindle 62 with respect to the central axis 27.

Additionally, a second grip 174 is positioned about the drive hub plate 46. The second grip 174 enables the drive hub 32 to be manually rotated. Thus, the push button pin 17 can enter into the bore 25 of the gear 24. When this occurs, the stroke adjustment grip 134 can be moved axially and rotationally. As this occurs, the sleeve 136, ring 138 and cam plate 160 are pushed upward. The cam tabs 170 on the bottom of the cam plate 160 disengage the slots 172 on the drive hub body 40. Thus, the cam plate 160 is able to be rotated by the grip ring 134. As this occurs, the posts 66, 78 are moved with respect to one another as they ride along in the slots 162, 164 of the cam plate 160. Thus, this adjusts the distance of the axes 27, 63 of the spindles 26, 62 with respect to one another. This provides for the oscillation rotation of the device.

In order to enable the eccentric cam plate 160 to be placed into a second position, the grip 134 is rotated. As the grip 134 comes into a second indexing position, the push plate 156 as well as the cam spring 166 push down on the cam plate 160. As the upward force is removed from the grip 134, the spring force pushes the cam tabs 170 back into engagement with another set of slots 170 in the drive hub body 40. This enables the cam plate 160 to be locked in position with respect to the drive hub 32 which, in turn, provides a different offset distance with respect to the spindle axes 27, 63. This can be repeated to move the second spindle 62 with respect to the drive spindle 26 into a desired position.

An axle lock bridge 180 is positioned adjacent to the drive hub 32. The axle lock bridge 180 includes legs 182 that slide in slots between the drive hub legs 44. Thus, the axle lock bridge 180 is positioned between the legs 44. Springs 184 are positioned in a slot 185 on the underside of the drive hub body 40 and the axle lock bridge 180 to bias the axle bridge 180 away from the drive hub body 40. The axle lock bridge 180 includes an aperture 186 to receive the head 65 of the spindle 62. When the workpiece mounting assembly spindle 62 is coaxially aligned with the drive spindle 26, due to the force of springs 184, the axle lock bridge aperture 186 receives the head 65 of the spindle 62 to lock the spindle 62 in a coaxial position with the drive spindle 26. This provides a true rotational or zero position. The axle lock bridge 180 includes flanges 188 that mesh with the ring cutouts 154 so that the axle lock bridge 180 is moved toward the housing head 20 when the ring 134 is moved in that direction.

Activation of the switch 16 rotates the spindle 62 on the stroke adjustor 30. The counterweight mechanism 36 balances the rotational imbalance due to the spindle 62 being offset from the central axis 27 of the spindle 26. Thus, the spindle 62 rotates the workpiece at a stroke away from the central axis 27.

Turning to FIGS. 8-17, a second embodiment is illustrated. The reference numerals that relate to similar elements have been used and increased by 200.

The tool with an adjustable stroke device is designed with the reference numeral 200. The tool 200 includes a motor 212, a power source 214, and switch 216 for activating and deactivating the power source. The power source is shown as cord but a rechargeable battery could be used.

The motor includes a pinion 218 that is positioned inside a housing head 220. The housing head 220 includes a cavity to house a drivetrain 222. The drivetrain 222 includes a gear 224 meshing with the pinion 218 and rotating spindle 226. The stroke adjuster 230 is rotatable coupled with the spindle 226 and is mounted at the bottom of the head housing 220.

The head housing 220 includes a handle 215. The handle 215 enables the user to utilize the tool for the polishing or buffing action. The head housing 220 includes a skirt 310 that houses the spindle 226. The skirt includes a cylindrical wall 312 that includes a plurality of recess 314 that receive teeth from stroke adjuster 230 that will be explained later. Also, the wall 312 includes a groove 316 that is unseen when the stroke adjuster 230 is in a proper locked position. Also, the skirt 310 includes an interior cylindrical wall 318 that houses the spindle 326 and bearings 320. The cylindrical housing includes legs 322 that enhance the securement of the stroke adjuster 230.

The stroke adjuster 230 includes a drive hub 232, a workpiece mounting assembly 234, a counterbalance 236 and a stroke adjustment mechanism 238. The drive hub 232 includes a drive hub body 240 with a shaft 242 as well as extending legs 244. The shaft 242 receives the spindle 226 via a configured bore 243. A hub plate 246 is attached to the legs 244 via threaded fasteners. The drive hub body 240 includes a plurality of slots 248 that couple with the counterweight mechanism 236 and the workpiece mounting assembly 234 as will be explained later. Also, the legs 244 define a slot 245 that receives a bearing carriage assembly 254. Additionally, the bottom surface of the drive hub 240 includes a bore to receive a retention pivot member 330.

The pivot member 330 has an overall U-shape with a polygonal contoured channel 332 to receive a shaft of the workpiece mounting assembly 234 as will be explained herein. The pivot member 330 receives and positions the spindle 262 in its rotational position.

Additionally, the hub plate 246 includes a plurality of slots 250 that couple with the counterweight mechanism 236. The hub plate 246 includes an aperture 252 with an elliptical shape that receives a portion of the workpiece mounting assembly 234. Thus, rotation of the spindle 226 is applied to the drive hub 232 to drive the stroke adjuster 230.

The workpiece mounting assembly 234 includes a backing plate 253 and a carriage 254. The backing plate 253 receives a pad to contact a working surface. The carriage 254 includes a cylindrical portion 256 to receive bearings 260. The carriage 254 includes flanges 258 that position the carriage 254 within the slot 245 between the legs 244 of the drive hub body 240. This enables the carriage 259 to slide in the hub body 240.

A spindle 262 is rotatable in the bearings 260. The spindle 262 includes a threaded bore 264 to receive a threaded tip that retains the backing plate 253 to the spindle. The spindle 262 passes through the aperture 252 in the hub plate 246. The carriage 254 includes a post 266 that passes through the slot 248 in the drive hub body 240. The post 266 is coupled with the stroke adjustment mechanism 238 as will be explained later.

The counterweight mechanism 236 includes a frame 268 and a counterweight 270. The counterweight 270 is ring shaped and secured to the frame 268 via fasteners 272. The frame 268 has an overall U-shape. The frame 268 includes a plurality of posts 274 that pass through channels 250 in the hub plate 246. Thus, the counterweight ring 270 is attached to the underside of the hub plate 246. Also, the counterweight ring 270 includes a slot or channel 276 that enables the spindle 262 to pass through the channel 276. The counterweight frame 268 also includes a post 278. A post 278 passes through the slot 248 in the drive hub body 240.

A cam plate 360 includes a pair of arcuate slots 362, 364. One slot 362 receives the carriage post 266 and the other arcuate slot 364 receives the counterweight frame post 278. The cam plate 360 includes a plurality of radially projecting teeth 368. The teeth 368 are rectangular and are separated by rectangular recesses 369. The cam plate 360 is rotated by the stroke adjustment mechanism 238 as will be explained herein. As this occurs, the posts 278, 266 move the counterweight mechanism 236 and the workpiece mounting assembly 234 laterally with respect to one another to vary the distance between the two. Also, the rotational movement of the stroke adjustment mechanism moves the axis 263 of the spindle 262 toward or away from the central axis 227 of the drive spindle 226. Thus, depending upon the position of the spindle 262 with respect to the central axis 227, the spindle 266 is positioned in a truly rotational position or is offset to provide orbital movement of the workpiece mounting assembly 234.

A pusher ring 370 is positioned about the hub body 240. The pusher ring 370 includes a plurality of rectangular peaks 372 and valleys 374. The peaks 372 and valleys 374 mesh with the teeth 368 and recesses 369 of the cam plate 360. Also, the pusher plate 370 includes blocks 376 that fit into gaps between the legs 244. This enables the pusher ring 370 to ride up and down along the legs 244 of the hub body 240. Also, springs 378 are positioned in the blocks 376 to bias the pusher ring 370. The springs seat bores 380 within the blocks 376. Additionally, posts 382 project from the hub plate 246 to seat the other end of the springs 378.

The stroke adjustment mechanism 238 has an overall cylindrical shape. It includes a wall 410 with a plurality of stepped portions. A bore 412 extends through the wall 410. The bore expands from one end to the other. The wall 410 includes a grip portion 414 includes indicia that provides the user with marking to identify the different rotational and orbital settings of the stroke adjuster. Thus, the indicia indicates a true rotational position as well as several orbital positions. The grip 414 defines a channel 416. The channel 416 is positioned about the wall. A plurality of teeth 418 are positioned in the channel 416 to engage the recesses 314 on the skirt housing 310. An inner channel 420 is at one end of the wall 410 to receive a spindle lock 430 as will be described later. Also, the wall defines a spring seat 422. A plurality of rectangular teeth 424 are provided on the interior surface of the wall 410. The teeth 424 mesh the cam 360 as will be described herein.

A spindle lock 430 is coupled with the stroke adjustment mechanism 238.

The spindle lock 430 includes a spring seat 432, a shaft lock 434 and a spring 436. The spring seat 432 includes a groove 438 to receive a portion of the spring 436. Also, the seat 432 includes recesses 440 to receive tabs 442 of the shaft lock 434. The spring seat includes cutouts 444 that receive legs 322 from the housing 310. The shaft lock 434 includes recesses 446 positioned between the tabs 442. Also, the shaft lock 434 includes a wall 448 extending from the tabs 442 that includes radially extending rectangular shaped teeth 450. The teeth 450 pass through recesses 452 in the stroke adjustment mechanism 238. This enables the teeth 450 access into the channel 420 to retain the shaft lock on the stroke adjuster mechanism 238. The shaft lock 434 is held in the channel 420 as seen in FIGS. 11A and 11B. The spring seat 432 includes legs 454 that include an outer groove 456 that enable C clip 458 to lock the spring seat 432 on the legs 322 of the housing 310. Thus, the stroke adjustment mechanism 238 is biased by the spring 436 on the housing 310.

FIGS. 11A and 11B illustrate the stroke adjuster 230 in a first and second position. In FIG. 11A, the stroke adjustment mechanism 238 is in a first position with the teeth 418 engaged in the recesses 314. The indicia provides the user with the setting of the tool. In order to move the stroke adjustment mechanism from one position to the other, the stroke adjustment mechanism grip 414 is pulled downward toward the backing plate 253. As this occurs, the stroke adjustment mechanism 238 moves downward against the force of the spring 436. The shaft lock 434 is pushed downward by the stroke adjustment mechanism 238 into contact with the spring seat 432 (FIG. 11B). As this occurs, the polygonal aperture 470 engages the polygonal surface 472 on the shaft 242. This locks the spindle 226 and drive hub 232 from rotating. However, the stroke adjustment mechanism 238 is free to rotate.

As the stroke adjustment mechanism 238 is moved downward, the teeth 424 push the push ring 370 downward. As this occurs, the teeth 424 engage the recesses 369 of the cam plate 360. This enables the stroke adjustment mechanism 238 to engage the cam plate 360. As the stroke adjustment mechanism 238, via the grip 414, is rotated, the cam plate 360 is rotated. As this occurs, the work piece mounting assembly 234, via post 266, moves with respect to the counterbalance mechanism 236. The post 266, as well as the post 278, are moved laterally with respect to one another in the arcuate slots 362 and 364 as the cam plate 360 is rotated. This adjusts the distance between the central axis 227 and the spindle axis 263. Thus, this provides the stroke adjuster 230 with its rotational and orbital positions.

Once rotation is complete, the user releases the grip 414. The spring 436 biases the stroke adjustment mechanism 238 upward, in the opposite direction, toward the skirt housing 310. As this occurs, the teeth 418 will re-engage the recesses 314 enabling the user to use the device. However, the groove 316 in the skirt housing 310 becomes visible when the stroke adjustment mechanism 238 is being rotated. If the user can view the groove 316 after rotation, the user is visually notified that the stroke adjustment mechanism 238 is not in a locked position.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An adjustable stroke mechanism for a random orbital machine comprising:
    a housing having a central axis and a wall defining a cavity;
    at least one counterweight movably disposed at least partially within the cavity;
    a mounting assembly disposed at least partially within the cavity, the mounting assembly including a workpiece attachment mechanism;
    a stroke adjustor coupling the at least one counterweight with the mounting assembly, the stroke adjustor is axially movable along the central axis and is rotatable about the central axis enabling the at least one counterweight and mounting assembly to move with respect to one another such that a distance between the at least one counterweight and the mounting assembly may be variably adjusted which, in turn, variably adjusts a stroke radius of the workpiece attachment mechanism with respect to the central axis of the housing.

2. The adjustable stroke mechanism of claim 1, wherein the stroke adjustor includes an adjustor ring and a cam mechanism, the adjustor ring surrounding the wall of the housing, the adjustor ring is axially movable along the central axis and is rotatable around the central axis.

3. The adjustable stroke mechanism of claim 2, wherein the counterweight engages the cam mechanisms for moving the counterweight in response to cam movement.

4. The adjustable stroke mechanism of claim 2, wherein the mounting assembly including a bearing carriage engaging the cam mechanism for moving the mounting assembly in response to cam movement.

5. The adjustable stroke mechanism of claim 2, further comprising a locking mechanism associated with the cam mechanism to lock the workpiece attachment mechanism.

6. The adjustable stroke mechanism of claim 5, wherein the cam mechanism further comprises at least one tab, the tab engaging a slot in a hub for locking the stroke adjustor.

7. The adjustable stroke mechanism of claim 1, the workpiece attachment mechanism further comprising a spindle, the spindle extending through a bearing carriage and into the counterweight.

8. The adjustable stroke mechanism of claim 7, further comprising at least one bearing surrounding the spindle and the at least one bearing disposed within an orifice of the bearing carriage.

9. A method of adjusting a stroke of a random orbital machine comprising:
    coupling an adjustable stroke mechanism to a random orbital machine, the adjustable stroke mechanism comprising:
        a housing having a central axis and a wall defining a cavity;
        at least one counterweight movably disposed at least partially within the housing;
        a backing plate mount assembly disposed at least partially within the housing; the backing plate mount assembly including a mechanism for attaching to a workpiece;
        a stroke adjustor is axially movable along the central axis and is rotatable about the central axis coupling the at least one counterweight with the mounting assembly;
    adjusting the stroke adjustor;
    moving the counterweight and mount assembly with respect to one another;
    variably adjusting a distance between the counterweight and the mount assembly; and
    variably adjusting a stroke radius of the mechanism with respect to the central axis of the housing.

10. A rotating tool comprising:
    a housing and a motor, the motor including a drive train;
    an adjustable stroke mechanism coupled with the drive train, the adjustable stroke mechanism comprising:
        a stroke adjustor having a wall defining a cavity;
        at least one counterweight movable disposed at least partially in the cavity;
        a mounting assembly disposed at least partially within the cavity, the mounting assembly including a workpiece attachment mechanism;
        the stroke adjustor coupling the at least one counterweight with the mounting assembly, the stroke adjustor is axially movable along the central axis and is rotatable about the central axis enabling the at least one counterweight and mounting assembly to move with respect to one another such that a distance between the at least one counterweight and the mounting assembly may be variably adjusted which, in turn, variable adjust a stroke radius of the workpiece attachment mechanism with respect to the drive train.

11. The rotating tool according to claim 10, wherein the stroke adjustor including a cam for moving the at least one counterweight with respect to the mounting assembly.

12. The rotating tool according to claim 11, wherein for movement the stroke adjustor wall engages the cam.

13. An adjustable stroke mechanism comprising:
    a stroke adjustor having a wall defining a cavity;
    at least one counterweight movable disposed at least partially in the cavity;
    a mounting assembly disposed at least partially within the cavity, the mounting assembly including a workpiece attachment mechanism;
    the stroke adjustor coupling the at least one counterweight with the mounting assembly, the stroke adjustor including a cam, the stroke adjustor is axially movable and is rotatable, the stroke adjustor enabling the at least one counterweight and mounting assembly to move with respect to one another such that a distance between the at least one counterweight and the mounting assembly may be variably adjusted which, in turn, variable adjust a stroke radius of the workpiece attachment mechanism with respect to a drive train.

14. The adjustable stroke mechanism according to claim 13, wherein the moves the at least one counterweight with respect to the mounting assembly.

15. The adjustable stroke mechanism according to claim 14, wherein for movement the stroke adjustor wall engages the cam.

16. The adjustable stroke mechanism of claim 14, wherein the counterweight engages the cam for moving the counterweight in response to cam movement.

17. The adjustable stroke mechanism of claim 14, wherein the mounting assembly including a bearing carriage engaging the cam for moving the mounting assembly in response to cam movement.

18. The adjustable stroke mechanism of claim 14, further comprising a locking mechanism associated with the stroke adjustor to lock a drive spindle.

* * * * *